Feb. 4, 1947. A. H. ANDERSEN ET AL 2,415,328
ACETYLENE GENERATION
Filed April 14, 1945 4 Sheets-Sheet 1

Fig. 1.

INVENTORS
Arthur Hoijord Andersen
Milton Eaton &
Andrew Clifford Holm
By Alan Ausberg
ATTORNEY

Fig. 2.

Feb. 4, 1947.    A. H. ANDERSEN ET AL    2,415,328
ACETYLENE GENERATION
Filed April 14, 1945    4 Sheets-Sheet 4

INVENTORS
Arthur Hojjord Andersen
Milton Eaton &
Andrew Clifford Holm
By
ATTORNEY Patented Feb. 4, 1947

2,415,328

UNITED STATES PATENT OFFICE 2,415,328

ACETYLENE GENERATION

Arthur H. Andersen, Milton Eaton, and Andrew C. Holm, Shawinigan Falls, Quebec, Canada, assignors to Shawinigan Chemicals Limited, Montreal, Quebec, Canada, a corporation of the Dominion of Canada Application April 14, 1945, Serial No. 588,318
In Canada December 30, 1944

22 Claims. (Cl. 48—38)

INTRODUCTION

This invention relates to continuous processes for producing a gas by reacting a liquid with a solid, for instance, acetylene by reacting water with calcium carbide, and preferably includes the simultaneous recovery of the residual solid in usable form. The invention has particular utility as applied to processes in which the water to solid ratio is such that a comparatively dry hydrated solid is recovered.

A principal object of the invention is to provide for such processes, automatic regulation and control and thus to solve many long-standing problems of large scale production. Other objects will be apparent from the description to follow.

According to the invention, in a preferred form, the variable factors of the process are subjected to automatic regulation and control in response to a selected condition individually and/or severally as follows—the rate of feeding solids to a selected condition which may be, for example, the demand for gas, gas pressure, or the maintenance of a constant rate of gas flow—the ratio of water to solid relatively to a temperature control point, representing the demands of the reaction as pre-established—the temperature control point itself to changes in the nature of the starting solid, which are reflected in a changing demand on the part of the reaction for liquid—the rate of discharge of the hydrated solid in proportion to the amount generated in the reaction. Subsidiary control factors are desirably made automatically responsive to these main factors so that the entire regulation and control of the generating process may be accomplished automatically.

DETAILED DESCRIPTION

A particular embodiment of this method has been applied to the type of process disclosed in U. S. Patent No. 2,343,185. By way of example, this embodiment will be discussed more or less in detail and by reference to the accompanying drawings so that the various aspects of the invention resident in the method in general and in the apparatus for accomplishing it will be clear. In the drawings, the apparatus will be seen to consist of—a generating unit, including a series of acetylene generating chambers equipped with discharge mechanism for removing from the generating unit the reaction products, acetylene and calcium hydrate—a scrubbing unit for removing impurities from the gas—a cooling unit for cooling the gas—a special carbide feed mechanism and a control system therefor—a water-feed control mechanism—a discharge control mechanism—means connecting these various parts and other features of regulation and control which will be discussed in more detail as the description proceeds.

Generating unit

Figure 1:
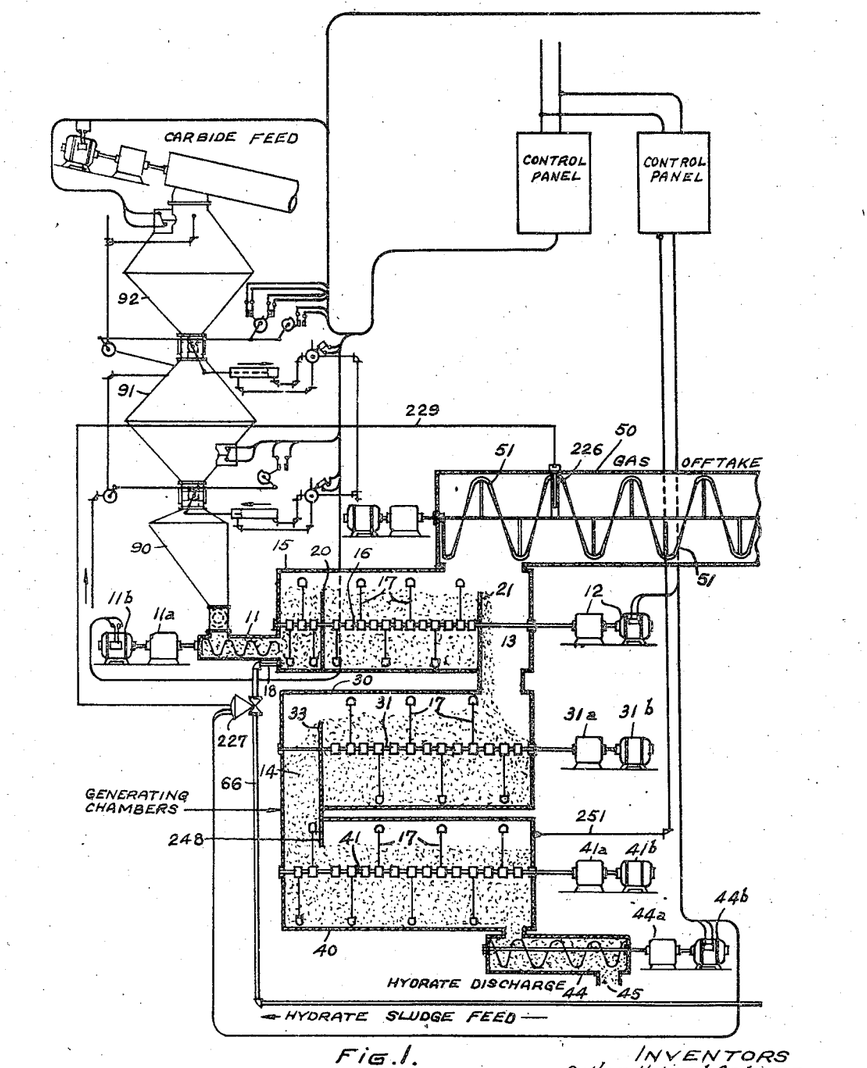
Figures 1 and 2 (in continuation of Figure 1) embody a diagrammatic arrangement of the generator, auxiliary apparatus and control featutres, Figure 1, including in particular the generating unit proper and feeding unit, and Figure 2 the scrubbing and cooling units.
Figure 3:
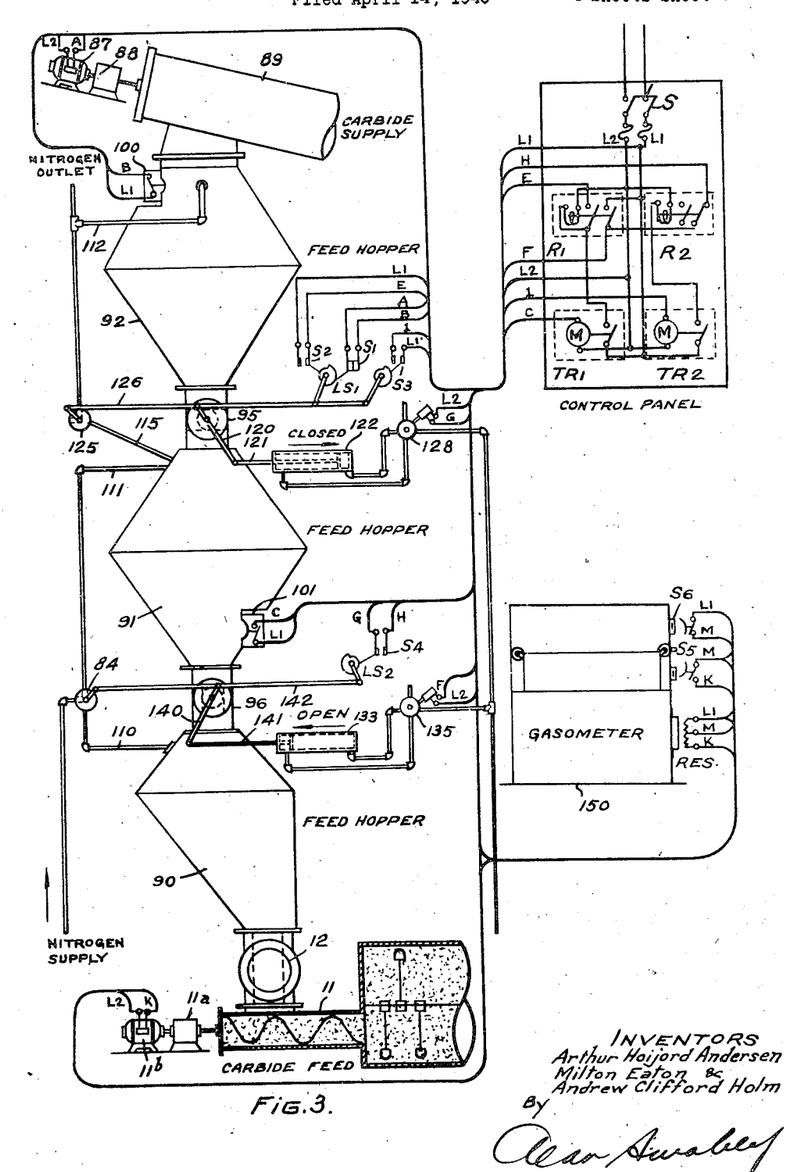
Figure 3 is an enlarged diagrammatic view of the special carbide feeding unit of the apparatus shown in Figure 1, including its electrical features.

Referring to Figure 1, the generating unit is essentially that described in U. S. Patent No. 2,343,185 and includes super-imposed drums 15, 30, and 40. The drum 15 is rounded at the bottom and flat at the top and is fitted with two parallel horizontal shafts 16 on which are mounted agitator paddles 17. The shafts 16 are suitably driven so as to be capable of operation under a heavy load. To an inlet in the drum 15 is connected a screw feed 11 (Fig. 3). The feed 11 is provided with a variable speed drive 11a driven by an electric motor 11b. The drum 15 is divided into two sections or chambers by a dam 20. The chamber at the feed side of the dam 20 is, as will be seen, the chamber in which the major portion of the charge is reacted. A dam 21 is also provided at the output end of the drum 15. A water inlet 18, preferably comprising three separate open-ended pipes is employed to introduce water into the drum 15. The water inlet is connected by means of a pipe 66, as will be explained, to a source of sludge containing some of the residual solid, the water content of which is used for the reaction. The water may be introduced above or below the level of the carbide feed screw 11, but it is of advantage to locate the discharge of the solid feed screw below the level of the hydrated solid-liquid mixture in this first chamber.

The drum 30 is provided with a single shaft 31 on which are mounted agitator paddles 17 and the drum 40 with a shaft 41 on which are also mounted agitator paddles 17. The shafts 31 and 41 are driven through speed reducers 31a and 41a by electric motors 31b and 41b respectively. A passage 13 connects the input end of the drum 30 with the output end of the drum 15. The drum 30 is also provided with a dam 33 at its output end. The drum 30 is connected with the drum 40 by a passage 14.

At its output end, the drum 40 is connected to a horizontal screw device 44 leading to a discharge opening 45. The screw device 44 is adapted to remove hydrate from the drum 40 and also to provide a seal to prevent the escape of gas. The screw 44 is driven by an electric motor 44b through a speed reducer 44a.

Scrubbing and cooling units

From the generating unit, the gas is taken to the scrubbing and cooling units for further treatment. The gas offtake 50 leads from the output end of the top drum 15. It is semi-circular in shape and preferably fitted with a scraping device 51 in the form of a ribbon-screw. This device keeps the inner wall of the offtake free from deposited hydrate. The offtake 50 enters a spray tower 60 (Fig. 2) adapted for removal from the gas of the entrained hydrate. From the top of the tower 60 the gas passes through a passage 68 to the bottom of the cooling tower 70, and after cooling, out through an offtake 80. For feeding liquid and hydrate sludge as will be described to the cooling and scrubbing towers, the following arrangement is provided. Fresh water is introduced into the cooling tower from sprays 78 from a suitable source of fresh water supply. Cold, recirculated cooling water is also introduced into the cooling tower 70 from sprays 77. By means of these sprays, the gas is cooled to the desired temperature and the steam therein condensed before the gas is discharged from the system through the outlet 80. The hot water is collected in the reservoir 72 at the base of the cooling tower and circulated through pipe 73, a pump 74 and a heat exchanger 75, in which the water is cooled to the desired temperature. This cooled water then passes through the pipe 76 partly into the cooling tower 70 by way of the sprays 77 and partly into the scrubbing unit 60 through the sprays 61.

Figure 2:
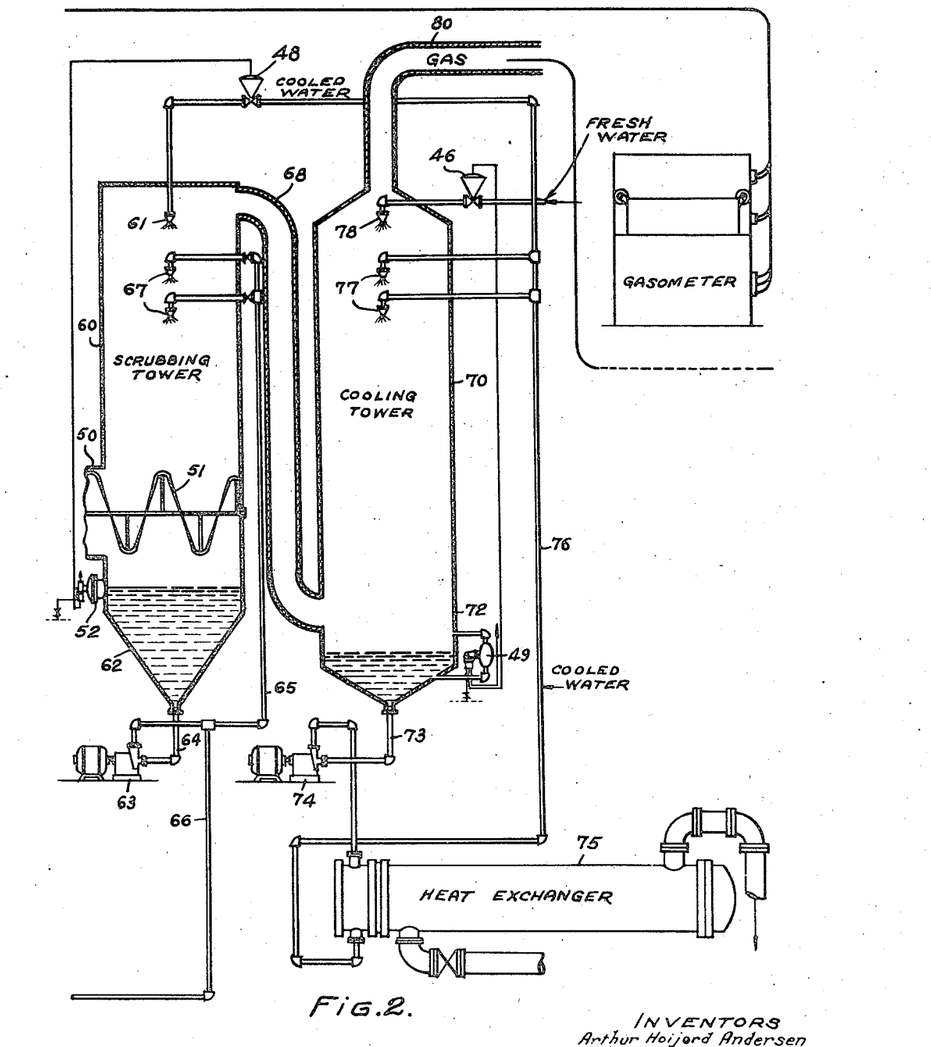

The scrubbing unit 60 has the purpose of removing the considerable quantity of lime hydrate dust that is entrained in the gas. To accomplish this the gas is first passed counter-current to a spray of hot sludge entering the tower by the sprays 67 and consisting of a suspension of lime hydrate in hot water. Finally, the gas is scrubbed by cold, clear water entering the scrubber by the sprays 61 to remove the residual lime hydrate from the gas. The gas is only slightly cooled in this scrubber and very little steam condensed out of it, but all of the entrained lime hydrate is removed. The hot sludge is collected in the reservoir 62 at the foot of the tower and recirculated through the pump 63 and pipe 64 to the scrubber 60 by the pipe 65 and sprays 67. Part of the sludge may also be pumped through the pipe 66 to the water inlet 18 of the generator and used to slake carbide.

It should be noted that according to this refinement of the applicants' process, the only fresh water added to the system is to the sprays 78 of the cooling tower. The only water lost from the system is that used up in reacting with carbide to form acetylene and lime hydrate, and the small quantity carried out as moisture in the lime hydrate and in the gas. The water introduced by the sprays 78 replaces this water. The large excess of water over that required for complete reaction which is added to the carbide in the reaction chamber in order to ensure wet generating conditions, is evaporated off as steam by the heat of the reaction. This steam is subsequently condensed out of the gas, the water used to scrub the gas free of lime hydrate particles, and the resulting hot sludge returned in the generator to slake further carbide. By virtue of this cyclic system there is no discharge of water or sludge to a sewer or sump and therefore absolutely no loss of acetylene or lime hydrate. This is a great advantage over other dry generation processes now in use, where the loss of these materials in discharged scrubbing and cooling liquors may be considerable, and the acetylene dissolved therein may lead to explosions in sewers and the like. By using hot sludge from this cyclic system in place of cold water for slaking the carbide, a large excess of water may be used in this reaction with definite beneficial effects.

Provision is also made to discharge hot sludge to a suitable sludge pond (not shown on the drawings) by the pipe 66 and to introduce fresh, cold water to the generator by the inlet 18, if this method of operation should be desired.

Operation in general of generating unit

In carrying out the process, calcium carbide of any size varying preferably from pea to dust is fed continuously in a manner to be described later, by means of the variable speed screw feed 11 into the first chamber of the drum 15. According to the apparatus shown, water or hydrate sludge is fed into the drum by way of the inlet 18. The water or sludge may be hot or cold but in the embodiment shown, the sludge is preferably pumped into the generator at the temperature of about 185° F. The lower limit to the amount of water charged into the process in relation to the carbide is determined entirely by the amount of carbide, that is sufficient water must be added to react the carbide completely and to absorb the heat of reaction. The upper limit to the amount of water charged into the process in relation to the carbide will be determined by the water content which is desired in the hydrate discharged taking into consideration as well the amount of water which is evaporated as steam, during the reaction. This will, of course, depend on the use to which the hydrate is to be put. Under some conditions, it may be desirable for the hydrate to be discharged substantially dry (that is with a water content of less than 3%). In other cases, it may be desirable for the hydrate to contain considerable water (for example 20%). In any event, the amount of water charged at the starting point of the reaction is sufficiently low to keep the water content of the resulting hydrate below a predetermined maximum. Quantitatively, this amount will vary in different apparatus and under different conditions and with different grades of carbide. Usually the ratio of carbide to water fed is in the order of 1 to 2 parts by volume.

The first section formed between the inlet and the dam 20 is the actual generating chamber. The carbide is fed continuously while the water (or in the case of the preferred arrangement shown, the hydrate sludge) required for the generation is introduced by means of the three openings on the inlet 18. While the applicants have found it preferable to add most, if not all, the water to the generator through the intake 18 of the first chamber, particularly when the water contains hydrate sludge from scrubbing the gas, water may, for some conditions also be added at later stages. To this end, sprays or other inlets can be placed at subsequent locations in the generating chambers.

The agitator paddles 17 are operated to give a very thorough mixing action. These paddles are arranged on two parallel shafts in such a way that they are capable of operation under a heavy load.

Carbide, lime hydrate, and water are very thoroughly mixed by agitation in the top drum. Most of the carbide is slaked in the first compartment, the balance usually being entirely slaked in the second compartment. Occasionally, at high rates of feed on large-sized carbide, a small portion will go through to the second or third drum. Here, further water may be added if necessary by means of sprays. Besides permitting the slaking of residual carbide, the two bottom drums 30 and 40 also act as conditioning chambers to ensure even moisture distribution throughout the mass of lime hydrate.

The dams 20, 21, and 33 serve to maintain a fairly constant level of materials in the drums and also prolong the time that the material remains in them. The dam 20 forms a chamber at the feed end of the top drum, into which according to preferred operation all the water used in the generation is introduced, so that the mass in this chamber is thoroughly wetted and overheating avoided. This impedes the formation of undesirable gaseous impurities and permits the rapid and uniform slaking of the carbide. According to modified operation additions of water can also be made subsequently to the first chamber. The dam 20 also functions to prevent the mixing of the incoming carbide and water with the lime hydrate already present as a result of preceding reaction and recurrent rewetting and drying of the hydrate is avoided. This results in a maximum ratio of liquid water to total solids at any point in the machine incidental to which is an increase in the capacity of the apparatus. The dams 20 and 21 form in effect horizontal chambers vertically separated so that the flow between them is baffled. In the preferred form shown, the chamber formed between the dams 20 and 21 is longer than that between the dam 20 and the wall at the feed end of the dam 15. From the bottom drum the lime hydrate is removed by means of the screw 44. The acetylene gas formed by the slaking of the carbide is first in intimate contact with the excess water in the first chamber during and immediately after generation; it then passes up through the offtake 50.

The apparatus described thus far in the detailed description is essentially that disclosed in U. S. Patent No. 2,343,185. This will serve as a basis for the understanding of the features and procedures of the present invention.

*Carbide feed*

An important and novel feature facilitating the completely automatic control of the carbide feed is the special feeding unit illustrated in detail in Figure 3. This unit includes three superposed and connected hoppers 90, 91, and 92. The discharge end of the bottom hopper 90 is connected to the feed screw 11 by means of a passage and valve 12. The hoppers are conveniently of the conformation shown, but may take other forms to meet particular conditions. A valve 96 controls the connection between the hopper 91 and the hopper 90 and a valve 95 the connection between the hopper 92 and the hopper 91. These valves are automatically operated as will be described. Connected to the top of the hopper 92 is a carbide conveyor 89 adapted to deliver carbide from a source of supply (not shown). This conveyor is driven by an electric motor 87 through a speed reducer 88. The function of the hoppers and the associated mechanism is to ensure a continuous supply of carbide to the feed screw 11, and at the same time, to prevent the acetylene, which is under higher than atmospheric pressure, from escaping from the generator by way of the carbide feed screw. The lower hopper maintains the supply of carbide to the feed screw while the upper two hoppers go through an automatic recharging cycle. The valve 96 as will be explained is always closed when the valve 95 is open, and vice versa.

In order to provide for the automatic operation of this feed mechanism in response to the demands of the process, controlling instrumentalities of a mechanical and electrical nature are associated with the hoppers as follows. The hopper 92 is provided with a bin level switch 100 having a diaphragm which is depressed by the carbide to open the switch when it reaches the level of the diaphragm. Likewise, the hopper 91 has a bin level switch 101 adjacent its lower end, also having a diaphragm which is released to close the switch when the carbide falls below the level of the diaphragm. The switch 101 is linked to an electrical system adapted to open and close the valves 95 and 96, at the desired intervals governed by the level of the carbide in the hopper 91, which is, of course, dependent upon the demand for carbide by the feed screw 11. The details of this electrical system will be explained, but first it will be more convenient to refer to the general functioning of the hoppers in furnishing carbide to the feed screw 11.

*Operation of carbide feeding*

Let us suppose that a cycle is just beginning and all three hoppers contain carbide. The valve 95 is closed to prevent the upward escape of gas from the bottom two hoppers into the top hopper. The valve 96 between the lower and middle hopper is open. As the feed screw 11 feeds carbide into the generator, the carbide level in the middle hopper 91 falls. When the carbide level in this hopper falls below the diaphragm of the bin level switch 101, the latter closes to set into operation after a time delay interval sufficient to empty the hopper 91, electrical instrumentalities and associated mechanism adapted to cause the valve 96 to close and then the valve 95 to open. This allows the carbide in the hopper 92 to fall into the hopper 91. After a time delay (as determined by relay TR2) sufficient for the carbide to fall from the hopper 92 into the hopper 91, electrical instrumentalities cause the valve 95 to close, then the valve 96 to open and the motor 87 to start so that the conveyor 89 commences again to supply carbide to the hopper 92. As soon as the level in the hopper 92 again reaches the diaphragm of the bin level switch 100 the electrical instrumentalities are acted upon to cause the motor 87 and conveyor 89 to stop. Conditions are again as they were at the beginning of the cycle.

Nitrogen supply

During this feeding cycle, the undesirable results of negative pressure in the space above the carbide, caused by its withdrawal are overcome by replacing the solid material as it is being fed to the generator by a volume of an inert gas, preferably nitrogen, substantially equal to the true volume of the carbide. The gas is introduced through supply lines 110 and 111 to the hoppers 90 and 91 respectively. The supply of nitrogen to these supply lines is regulated and controlled in conjunction with the regulation and control of the valves 95 and 96 through mechanical, pneumatic, and electrical instrumentalities, as will be described.

In step with the carbide feed cycle, nitrogen is supplied as follows. With the valve 95 closed and the carbide being discharged from the hoppers 90 and 91 to the feed screw 11, nitrogen is introduced to the hopper 91 through the line 111 to replace the carbide withdrawn from the hopper 91. After the valve 96 closes and the valve 95 opens, nitrogen is vented from the hopper 91 as it is driven out by the incoming carbide, the gas escaping through the line 115. At the same time, nitrogen is introduced through the line 110 to replace carbide withdrawn from the hopper 90.

Carbide feed unit control system

The functioning of the mechanical features of the carbide feed as outlined are controlled by a system which will now be described. The bin level switch 100 is connected in series with the motor 87 and with the contacts S1 of a cam operated limit switch LS1.

The plug of the valve 95 is mechanically connected to a lever 120 having a pivotal connection with a connecting rod 121, which is in turn connected to the piston of a pneumatic operating device 122. A limit switch LS1 and the valve 125 are mechanically connected with the valve 95 for simultaneous operation therewith by a connecting rod 126. A pneumatic device 122 is operated by air pressure which is controlled by a four-way solenoid valve 128. When the solenoid of the valve 128 is de-energized, air is admitted to the left end of the device 122 holding the valves 95 and 125 in the closed position. When the solenoid of the valve 128 is energized, the air pressure is transferred to the right end of the device 122 and the left end of device 122 is exhausted to the atmosphere causing the piston and the piston rods to move to the left opening the valves 95 and 125 and operating the limit switch LS1 causing the contact S1 to open and the contacts S2 and S3 to close. When the solenoid of the valve 128 is de-energized, a spring causes it to return to its original position, thus transferring the air pressure back to the left end of 122 and exhausting the right end of the cylinder to the atmosphere. This returns the valves 95 and 125 to their normally closed position and the limit switch LS1 operates to re-close the contacts S1 and to re-open the contacts S2 and S3.

The carbide valve 96, the three-way nitrogen valve 84, and a limit switch LS2 are similarly interconnected and operated by a pneumatic device 133 similar to the device 122 which is under the control of a four-way pneumatic valve 135. There is the difference, however, that when the solenoid of the valve 135 is de-energized, air pressure is admitted to the right end of the cylinder 133 causing the valve 96 to be normally open. A lever 140 and arm 141 connect the piston of 133 with the valve 96 and the lever 140 and a connecting rod 142 connects the valve 96 with the valve 84 and limit switch LS2 respectively. The three-way valve 84 is also normally positioned to admit nitrogen to the top of the hopper 91. When the valve 135 is energized, the piston 133 operates to close the valve 96 and to operate the valve 84 transferring nitrogen pressure from the top of hopper 91 to the top of the hopper 90 and to close the contacts S4 of the limit switch LS2. When the solenoid of the valve 135 is de-energized, the valves 96 and 84 and the limit switch LS2 return to their normal position as shown in Figure 3.

The bin level switch 101 actuates a time relay device TR1 as described below. Other control apparatus includes relays, or solenoid operated switches R1 and R2. Time delay relays TR1 and TR2 are controlled by their timing mechanisms which determine the time interval between the instant of being energized and the closing of their contacts.

Operation of carbide feed control system

Figure 4:
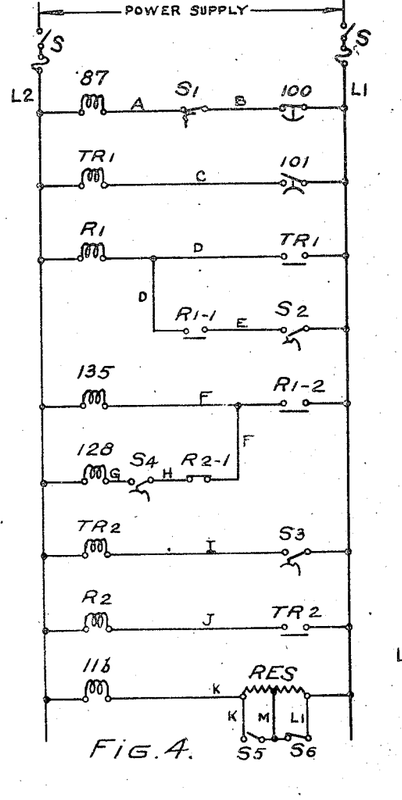
Figure 4 is a schematic diagram illustrating the operation of the electrical features of Figure 2.

The operation of the electrical-pneumatic system is best illustrated in the schematic diagram, Figure 4, and is as follows. When the switch S is closed, the carbide feed motor 87 is immediately energized causing carbide to be fed to the hopper 92. The feed screw motor 11b is also energized so that carbide is transferred from the hopper 90 to the generator. The conveyor speeds are arranged so that the carbide is fed to the hopper 92 faster than it is removed from the hopper 90.

When the hopper 92 is substantially full, the bin level switch 100 opens to de-energize the carbide conveyor motor 87. Carbide taken from the hopper 90 is being replaced by carbide passing through the valve 96 from the hopper 91.

When the hopper 91 is nearly empty, the bin level switch 101 closes its contacts to energize the time delay relay TR1. The time setting of this device is equivalent to the time required for hopper 91 to become emptied below the level of the valve 96. At the end of this interval, time relay TR1 closes its contacts to energize the relay R1. When relay R1 operates, one pair of its contacts R1—1 closes to prepare a holding circuit, and another pair of its contacts R1—2 closes to energize the solenoid of the four-way valve 135 causing valve 96 to close, the valve 84 to transfer the nitrogen pressure from the top of hopper 91 to the top of hopper 90, and the limit switch LS2 to close its contacts S4.

The closing of the contacts S4 energizes the four-way valve 128, which in turn causes valves 95 and 125 to open and limit switch LS1 to operate as previously described. Contacts S2 close to complete a holding circuit in series with relay contacts R1—1 holding the relay R1 energized. When the valve 95 opens, carbide immediately passes through to hopper 91 causing the contacts of 101 to open. This de-energizes the time delay relay TR1 allowing its contacts to re-open. The relay R1 remains energized through the holding circuit.

Contacts S1 of limit switch LS1 open to prevent operation of motor 87 while valve 95 is open. The contacts S3 of the limit switch LS1 close to energize time relay TR2, the period of which is equivalent to (or slightly greater than) the time required for the carbide in the hopper 92 to pass through the valve 95 into the hopper 91. The valve 125 opens to release nitrogen pressure in the hopper 91 thus permitting carbide to fall freely into it from the hopper 92.

At the termination of relay TR2 time delay interval, the contacts of TR2 close to energize relay R2. Normally closed contacts R2—1 of R2 open to de-energize valve 128 thus causing valves 95 and 125 to close. Contacts S1 of limit switch LS1 close to start motor 87. Contacts S2 open de-energizing relay R1 and contacts S3 open de-energizing time relay TR2.

When contacts R1—2 of relay R1 open, the 4-way valve 136 is de-energized causing the valve 96 to open and valve 84 to transfer the nitrogen pressure back to the top of the hopper 91. The contacts S4 of limit switch LS2 re-open to break the circuit to the valve 128. The carbide in the hopper 91 is again withdrawn until it falls below bin switch 101 and the above cycle of operation is repeated.

Regulation of carbide feed

The speed control resistor RES and associated switches S5, S6, Figure 3, function to regulate the speed of the motor 11b in such a way as to maintain the gasometer 159 half full. As the level rises above a predetermined point, the switch S6 is opened by means of a trip rod, cutting in the speed control resistance, and causing the motor 11b to decrease its speed and carbide to be fed to the generator at a rate corresponding with or less than the minimum rate at which gas is taken from the gasometer. Similarly, when the gasometer level falls below a predetermined level, the switch S5 closes and the speed control resistance is cut out causing the rate of carbide feed to increase to that corresponding with or faster than the maximum rate at which gas is taken from the gasometer.

The gasometer renders the carbide feed rate responsive to the demand for gas. This need not, of course be the selected condition, which may be, for instance, gas pressure, the maintenance of a constant rate of gas flow, or any other factor, the response to which is within the capacity of the particular apparatus employed.

Regulation of water supply

The demand of the carbide for water will depend upon the particular type of generation process to which the invention is applied. In the specific type of generation process being discussed, this demand is based on sufficient water being supplied to react the carbide completely, to absorb the heat of reaction and to keep the moisture content of the residual hydrate within predetermined limits. This is accomplished according to the present teachings by controlling the water feed in response to the temperature of the gaseous products released as a result of the reaction, as will be explained in more detail after the apparatus employed for accomplishing this effect has been described.

This apparatus includes a regulating valve 227 which controls the supply of water through the pipe 66 from the sludge tower to the top drum of the generator. This valve is made responsive to temperature in the pipe 50 by means of the following instrumentalities, best illustrated in Figures 1 and 5. In the pipe 50 is a temperature-responsive device 226 which consists of a tube filled with a liquid which expands and contracts with temperature changes. This tube is connected by tubing 229 with a bellows 228 which normally tends to hold the valve 227 open. The valve stem 236 terminates in a plate 237 located between the bellows and a spring 230, which tends to close the valve 227. When the temperature rises in the pipe 50, the liquid in the instrument 226 expands into the tube 229 and thence into the bellows 228 forcing the valve further into open position. This allows more water to pass through the pipe 66 into the generator. When the temperature in the pipe 50 decreases, pressure in the bellows 228 is reduced accordingly, and the valve 227 is consequently moved towards closed position thus reducing the supply of water to the generator.

Figure 5:
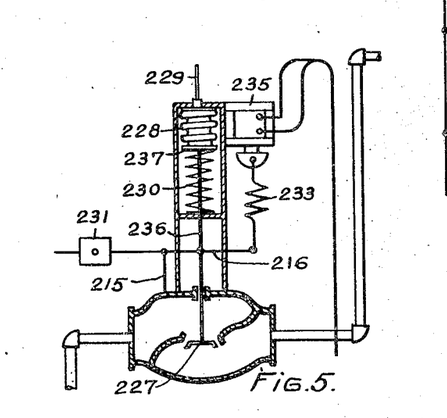
Figure 5 is an enlarged diagrammatic vertical section of the water control valve and subsidiary apparatus shown in Figure 1.

There are also other factors which must be taken into consideration and which do not depend upon temperature. For instance, as will be discussed in detail, the size of the carbide has an effect on the reaction and consequently must be compensated for. Hence, it is desirable to operate at different temperatures in the pipe 50 for different carbides. Thus it is necessary to provide means for varying the temperature control point. This is done by the following mechanism. On the valve 227 is mounted a bracket 215. On this bracket is pivoted a lever arm 216. On one end of the lever arm is a weight 231. To the other end of the lever arm is connected a tension spring 233 which is in turn connected to a solenoid 235. When the solenoid 235 is energized, the resulting tension in the spring 233 has the same effect as moving the weight further out on the lever arm 231 thus making it necessary to exert a greater force to open the valve 227, that is, under these conditions, greater pressure is required in the bellows 228 and consequently a higher temperature in the pipe 50 for the same opening of valve 227.

So that the solenoid 235 will operate to adjust the control point, the following instrumentalities are provided. The motor 12 driving the agitator in the top drum 15 is connected in series with the solenoid coil of a current relay 234. When the contacts of the relay 234 are made, the solenoid 235 is energized, causing the temperature control point to be raised as described above.

Thus, when the resistance to the agitator paddles and to the shaft 16 in the upper drum reaches a certain level, the motor 12 draws more current and the solenoid 235 is energized requiring a greater force to open the valve 227 and consequently a higher temperature in the pipe 50. In other words, the temperature control point is raised to a certain level. When the resistance of the shaft 16 is reduced below a certain point, the temperature control point is likewise decreased. Therefore, the temperature control point is maintained within a predetermined range. Within this range, the operation of the valve 227 will respond to the temperature in the pipe 50, its action being modulated, as described, so that at any given temperature, it is also responsive to the consistency of the charge of carbide in the generator.

The device illustrated in Figure 5 serves to show the principle of operation, in actual practice various types of equipment may be used, for example Minneapolis-Honeywell compensated automatic controls, described in their application data, section 151, would serve the purpose. Valve 227 would be a Modutrol type K900A valve. The temperature responsive device 226 would be a type T915 controller. The means for shifting the control point in response to changing motor load may be accomplished with a type T92 thermostat responsive to the motor load current and connected as a compensator potentiometer as shown on page 5 of the above bulletin.

More specifically, this control method takes into consideration the following factors. The reaction between carbide and water is exothermic, one pound of commercial carbide liberating in the neighborhood of about 700 B. t. u.'s by slaking. In a dry generator, this large quantity of heat is usually absorbed in the evaporation of an equivalent amount of water, thus giving rise to about ½ pound of steam in the acetylene generated from a pound of carbide. If less water is supplied than that which can be evaporated by the heat liberated, the temperature of the reaction mixture including the acetylene and steam, will rise sharply. On the other hand, if more water is supplied, there will be a comparatively small drop in temperature of the reaction mixture for a large excess of water. There is thus a critical temperature which theoretically lies at about 195° F. but which practically lies somewhat higher, from about 195° F. to about 210° F. (depending on the heat lost from the generator and the characteristics of the carbide). Above this there is a sharp change in temperature with a change in carbide-water ratio, and below it there is a comparatively small change. It is important, to work at or a few degrees above this critical point in order to obtain good results. The applicants have found that this critical point changes generally over a range of about 10° F. with a change in the characteristics of the carbide. They have also found that compensation can be made for this factor by changing the control point in response to a change in a critical temperature point as described above. This is believed to be a contribution to the art of acetylene generation.

*Scrubbing and cooling water control*

In order that the supply of feed water be kept in step with the demand for water as reflected in the movements of the valve 227, the following mechanism is provided. A liquid level responsive device 52 is connected to the bottom of the scrubbing tower. This device operates an automatic control valve 48 controlling the supply of water from the cooling unit to the scrubbing unit. Similarly a water-level responsive device 49 controls the valve 46 which governs the amount of fresh water fed through the sprays 78 to the cooling tower. With this arrangement, water is supplied to the scrubbing and cooling towers as it is depleted. Otherwise, the operation of the cooling and scrubbing units is as described above.

*Control of hydrate discharge*

Figure 6:
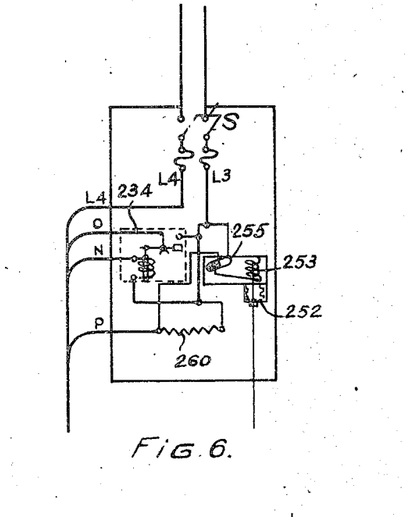
Figure 6 is a diagrammatic view of the electrical control features of the discharge mechanism shown in Figure 1.

In order to regulate the discharge of hydrate generated during the process, an automatic discharge mechanism is provided. This mechanism includes a baffle 248 adjacent the inlet end of the lower drum 40. This baffle extends downward from the ceiling of the drum thus sealing off the gas space above the hydrate from the rest of the generator, when the level of the hydrate reaches the baffle. A pipe 251 connects the discharge end of the lower drum with a pressure actuated switch (Fig. 6). The switch includes a bellows 252, a spring 253, and a mercury switch 255. Rising pressure causes the spring 253 to be compressed and the mercury switch 255 to close. The motor 44b (Fig. 7) driving the discharge screw 44 is connected in series with a speed control resistor 260. The switch 255 is connected across the resistor. When the switch 255 is closed the discharge speed of the motor 44b is just in excess of that corresponding with the maximum rate of gas generation. The discharge speed when 255 is open and the resistance 260 is in series with the motor 44b is just under that corresponding with the minimum rate of gas generation.

Figure 7:
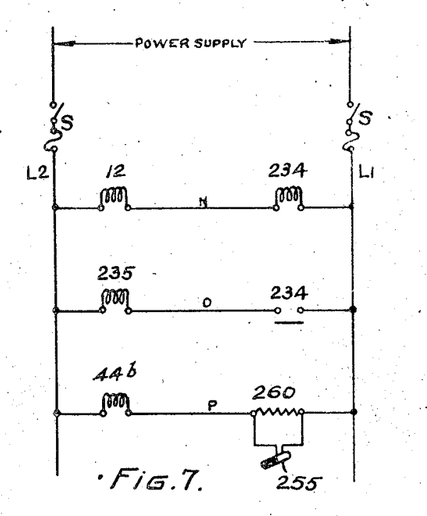
Figure 7 is a schematic view illustrating the operation of the features shown in Figure 6.

The operation of this automatic hydrate discharge is as follows (see particularly the schematic diagram Fig. 7). Assume that the level of the hydrate in the bottom drum is below the baffle 248. The pressure in the gas space of the drum is equal to that in the rest of the generator and lower than that required to close the pressure switch 255. Therefore, the resistance 260 is in series with the motor 44b and the discharge screw 44 is running at its lower speed. As a consequence, the hydrate level in the drum will rise and reach the baffle 248. The hydrate will continue to rise in front of the baffle and the weight of the hydrate will cause an increase in the pressure in the gas space above the hydrate in the bottom drum. This increase in gas pressure will cause the spring 253 to be compressed and the mercury switch 255 to close. The motor 44b will now have the full line voltage across its terminals and the discharge screw 44 will be operating at its higher speed. This will soon cause the level of the hydrate in the bottom drum to fall below the baffle 248. When this happens, the pressure in the gas space above the hydrate will again revert to its original value and switch 255 will open again thus changing the speed of the discharge screw 44 to the lower one.

Through this system, the hydrate level in the bottom drum is always maintained at or near the baffle and consequently the discharge screw is never allowed to run empty. A seal of hydrate between the atmospheres outside and inside the generator is thus maintained under all conditions of operation and without the danger of choking the generator.

*General summary of operation*

From this detailed description, it will be evident that all the different elements of the automatic control cooperate in meeting the demands of the selected condition, generally the demand for acetylene. More specifically, the demand for acetylene positions the gas holder and thereby regulates the carbide feed. The automatic feeding of the carbide to the generator through the multiple-hopper system proceeds at a rate equal to that at which carbide is required and is being fed to the generator. The addition of water by means of the temperature control is automatically made proportional to the actual rate of pure carbide fed. The rate of feed of the make-up water for the cooling and scrubbing systems is proportional to the water feed to the generator. The rate of hydrate discharge is governed by the level of hydrate in the bottom drum and is proportional to the amount of carbide fed to the generator.

It will be evident that, according to the terminology of Automatic Control Engineering, the condition of the reaction charge is a controlled variable which is virtually responsive to two interdependent automatic controllers. In one of these controllers the temperature responsive instrument 226 is a measuring means, the bellows 228 a controlling means, and the valve 227 a final control element. In the other automatic controller, the motor 12 and associated apparatus constitutes a measuring means (for measuring the consistency of the charge) while the solenoid 236 is a controlling means, and the valve 227 is again a final control element.

OBJECTS, RESULTS, AND ADVANTAGES

The results and advantages of employing the various features of the invention and of their various combinations are significant in overcoming many of the problems of generating acetylene on a large scale. Primarily, the invention fulfills the object of providing a safe and practical dry acetylene generator of substantially automatic character, thus requiring a minimum of attention and which at the same time automatically adjusts the rate of production of acetylene to the demand thereof, and to which carbide and water are being supplied continuously and which delivers automatically and continuously, as long as the demand exists, cold acetylene gas and substantially dry lime hydrate without losses of carbide, acetylene, or hydrate.

It must be realized that in the large scale continuous production of acetylene gas from calcium carbide there are many factors, which on a smaller scale may only be of minor importance, but which, due to the magnitude of the operations, assume the character of major problems. The present invention offers a novel solution to many of these problems as will be evident to one dealing with this art.

Carbide feed

The feed of carbide to a generator is a difficult problem in large scale operations. In small generators it is usual to have the total carbide necessary for a run contained in a closed hopper connected with a generator. When the hopper is emptied, generating operations can be momentarily stopped in order to have the hopper recharged. The infrequency of this operation makes the labour, expense, and acetylene losses of minor importance. However, with a large continuous generator, these losses become more appreciable. Moreover, a serious explosion hazard would be created had the generator to be opened several times an hour for recharging. Serious difficulties would also arise should the operator fail to recognize in time that the carbide hopper was empty.

According to the present invention, carbide can be continuously and automatically fed to the generator in response to the prevailing demand without any loss of acetylene and without the danger of explosion due to acetylene and air mixtures in or around the charging hoppers. The water supply control in conjunction with the carbide feed makes this system completely effective. In the feeding system, negative pressure which might lead to irregularity in feeding and even to complete stoppage is avoided by supplying nitrogen to the emptied sections of the hoppers. Also, diffusion of acetylene from the generator counter-current to the carbide is prevented. This system is much superior to that of venting the carbide hopper to the acetylene system, which has two principal disadvantages. First, there is the danger of explosion due to the admixture of entrained air, and secondly, there is a loss of acetylene equivalent in volume to the volume of carbide fed, due to the expulsion of acetylene from the empty hopper during the filling of this hopper with carbide.

Water control

The dry generation of acetylene also involves the balancing of water feed and carbide feed in such a way that acetylene gas of accepted purity and substantially dry lime hydrate are produced. Should this ratio of water to carbide be upset, one of two things happens. If the water is in deficiency, the temperature of the generator mounts and the acetylene polymerizes partly, higher sulphur content in the gas results, and there is, at the same time, the danger of unslaked carbide being discharged with the hydrate. Should the water be in excess, the hydrate becomes too wet and the generator as a consequence may stall. In a small intermittently operated machine, this is usually not a very serious matter. With a large continuous machine, however, it is a serious drawback because of the time it takes to cool down the generator for cleaning-out purposes. Moreover, the cleaning-out operation itself, together with the nitrogen purging and the cutting in and out of the acetylene system is expensive and time-consuming and also involves losses in acetylene and hydrate.

A means such as herein described for keeping the correct ratio of carbide and water entering the machine is, therefore, of utmost importance. If carbide is fed at a uniform rate and water added at a correct and uniform rate, there obviously would be no need for an automatic ratio controller. However, carbide is not uniform in composition. In fact, the percentage purity of the carbide can vary over a wide range, particularly in a large scale generating plant where more often carbide of sub-commercial grade is being used. Moreover, two groups of carbide of the same percentage purity will often generate acetylene at different rates. Such carbide is referred to as "fast" or "slow." Such a change in the rate at which the carbide is decomposed necessitates a corresponding temporary change in the water feed so as to allow the carbide stock in the generator to build up or decline until the previous rate of acetylene generation is re-established. Failure to do this can lead to an excessively wet or dry condition in the generator with the results previously mentioned. Furthermore carbide is never of uniform size and contains dust in varying proportions. These size differences are usually accentuated in large scale acetylene generation systems by segregation during handling in and out of tanks and hoppers. A change in size of the carbide feed can affect the ratio of carbide to water in two ways. Firstly, since the carbide feed to the generators is usually of a volumetric type, a change in the size of the carbide often makes a change in the weight of carbide per unit volume which upsets the ratio of carbide to water. Secondly, small pieces of carbide slake at a higher rate than large pieces due to an increase in the specific surface and this change in the rate of slaking demands a temporary adjustment of the water feed as explained above in connection with the effect of "fast" and "slow" carbide. Lastly, there are occasions when the carbide feed for one reason or another is momentarily held up, for example by hanging or bridging of the carbide in the feed hopper, or due to electrical or mechanical trouble with the carbide feeder. These many possibilities of unforeseen changes in the water demand and the serious consequences of failure to meet them emphasize the importance of the present invention to the large scale dry generation of acetylene. Regulation and control steps which had hitherto been considered as a matter of operating technique have now been rendered automatic.

Control of water to carbide ratio

Our control of the water to carbide ratio is based on the discovery that the problem may be resolved by obtaining a true average temperature indication on which to base the control. We found that this temperature must represent an essentially single uniform reaction system. This can be more easily explained by saying that a plurality of reaction centers must be avoided, since that can lead to a condition wherein one part of the generator is dry and over-heated while another is excessively wet and relatively cold with all the attendant disadvantages, even though the resulting temperature of the mixed gases from these various parts may appear "normal." This difficulty has been largely overcome by the applicants by feeding the carbide and water into the machine initially in one zone and by providing means to prevent their becoming isolated from one another.

We have also found that the thermometer bulb or other temperature sensitive element should be protected on the one hand from unslaked carbide which could give rise to false high temperature indications and on the other hand from water sprays on or near the thermometer since this could cause a local low temperature indication which does not reflect the true average conditions. This difficulty we have overcome by introducing both the carbide and water under the level of the reaction mixture.

Finally, we have found that the temperature sensitive element should be placed in such a location that it really receives its impulses from a representative mixture of all the gases and vapours coming off the reaction zone. This we have accomplished by providing a comparatively narrow gas passage from which we lead the gas without any prior scrubbing by means of sprays, or without any other treatment which will in any way influence its temperature, and by placing in this gas passage a temperature sensitive device of dimensions and other characteristics effective to react sufficiently accurately to the average temperature of the gas and vapour stream.

Scrubbing and cooling

The manner of circulation of the scrubbing and cooling water we employ is particularly advantageous. The automatic transfer of such portions of these circulated liquids as is necessary to maintain equilibrium in the circulation systems and the use of the liquid withdrawn from the lime hydrate scrubbing system in the generator as "feed water" contributes particularly to these advantages. By means of this arrangement, a completely automatic operation of the entire water-carbide feed, scrubbing system, cooling system is accomplished with the additional important feature that no liquid containing acetylene or lime hydrate is discharged from the generation system.

Discharge mechanism

The automatic discharge mechanism described above is based on the discovery that lime hydrate in the state at which it exists towards the discharge end of a dry generator exhibits some of the properties of a liquid. In fact, it exerts a pressure similar to the hydrostatic pressure of water. Using the pressure of a head of hydrate as a governing factor, we have been able to provide the automatic control of discharge substantially in step with the generation of the hydrate in the process and with the production of acetylene.

Other advantages will become apparent to those familiar with acetylene generation and related arts.

In addition, for the sake of simplicity and because this is a most practical application at the present time, it should be noted that the invention has been described specifically as applied to the production of acetylene and lime hydrate by the reaction of calcium carbide and water. It is not, however, intended that the disclosure should be confined to these particular materials but that it should extend to other reactions of a solid with a liquid to produce a gas and a substantially dry residue as will be understood by those skilled in the art.

It will, therefore, be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. In a process for the production of acetylene and lime hydrate, the steps of, feeding calcium carbide into a closed generating zone from a terminal portion of a feed zone which is cut off from the main source of carbide while replacing from an intermediate portion of said feed zone the carbide fed from the terminal portion, at the same time loading carbide into an initial portion of said feed zone, shutting off communication between said intermediate and terminal portions, bringing said intermediate portion into communication with said initial portion, replenishing said intermediate portion with carbide from said initial portion, then isolating said intermediate portion from said initial portion, re-establishing communication between the intermediate portion and the terminal portion and replacing carbide removed from each portion of the zone with an inert gas, and venting the inert gas from said portion as carbide enters.

2. A process of producing a gas and a solid residue by the exothermic reaction between a liquid and a solid, comprising, continuously and simultaneously carrying on; a generating step wherein the solid and the liquid are fed together in a reaction zone to generate the gas and to produce a substantially dry solid residue, and there is discharged a gaseous mixture including the reaction gas, liquid vapour and entrained finely divided solid, and the solid residue is discharged separately; a scrubbing step in which the gaseous mixture is scrubbed with liquid to remove therefrom entrained solid, the scrubbing liquid is collected and fed part to the scrubbing step and part to the generating step, and the scrubbed gas is discharged; and a cooling step wherein the scrubbed gas is treated by contact with relatively cool liquid to cool the gas and to condense entrained vapour, the cooling liquid and entrained substances are contacted with liquid, cooled and fed part to the cooling step and part to the scrubbing step and the cooled gas discharged; and the fresh liquid is added to the cooling step to replenish the liquid consumed by the generating step; controlling the supply of liquid to the generating step in automatic response to the temperature of the discharged gaseous mixture, controlling the amount of liquid fed to the scrubbing step in automatic response to the amount required by the generating step, controlling the amount of liquid fed to the cooling step in automatic response to the amount required by the scrubbing step; and controlling the supply of starting solid in response to a selected condition, whereby the supply and discharge of all the constituents to and from all said steps is made responsive to said selected condition.

3. An apparatus according to claim 14, including means responsive to a selected condition adapted to act on said solid control means thereby to feed solid in response to said selected condition.

4. In an apparatus for generating a gas and a residual solid by the reaction of a liquid and a solid, including a generating chamber; a feed mechanism to deliver solid to said generating chamber; supply mechanism for supplying solid; an initial chamber, an intermediate chamber and a delivery chamber communicating in series and disposed between said feed mechanism and said supply mechanism; a first valve between the initial chamber and the intermediate chamber, a second valve between the intermediate chamber and the delivery chamber; means responsive to the level of solid in the intermediate chamber for closing the second valve and opening the first valve, and after a definite time reclosing the first valve and reopening the second valve, and means responsive to the level of solid in the initial chamber for stopping and starting said supply means.

5. An apparatus, according to claim 8, wherein the means responsive to the second bin level switch includes delay instrumentalities effective to delay the closing of the second valve and the opening of the first valve for a time sufficient to allow all the solid to pass from the intermediate chamber to the delivery chamber, means responsive to the opening of the first valve including delay instrumentalities effective to delay the reclosing of the first valve and reopening of the second valve for a time equivalent to that required for the solid to pass from the initial chamber to the intermediate chamber.

6. In an apparatus according to claim 17, means for replacing with an inert gas solid removed from said chambers.

7. In an apparatus according to claim 17, means for supplying an inert gas, a first gas valve, a second gas valve, a first gas passage from said initial chamber to said intermediate chamber controlled by said first gas valve, a passage to the atmosphere from said initial chamber, a second gas passage leading from said intermediate chamber to said delivery chamber controlled by said second gas valve, a third gas passage leading from said gas supply to said second passage and controlled by said second valve, an operative connection between said first valve and said first gas valve whereby the first gas valve is opened when the first valve is opened to allow gas to pass from the intermediate chamber to the initial chamber, an operative connection between the second valve and the second gas valve to open the communications between the gas supply and the delivery chamber when the second valve is closed and to open the communication between the gas supply and the intermediate chamber when the second valve is open.

8. In an apparatus for generating a gas and a residual solid by the reaction of a liquid and a solid, including a generating chamber; a feed mechanism to deliver solid to said generating chamber; supply mechanism for supplying solid; an initial chamber, an intermediate chamber and a delivery chamber communicating in series and disposed between said feed mechanism and said supply mechanism; a first valve between the initial chamber and the intermediate chamber, a second valve between the intermediate chamber and the delivery chamber, a first bin level switch near the top of said initial chamber, a second bin level switch near the bottom of said intermediate chamber, means responsive to the second bin level switch for closing the second valve and for opening the first valve, means responsive to a timing device for closing the second valve and opening the first valve and means responsive to the first bin level switch for stopping and starting the supply means.

9. An apparatus for the exothermic reaction of a liquid and a solid with incidental generation of a gas, comprising, an enclosed system including; a generating unit in which the reaction is carried out, a liquid inlet to said generating unit, means for feeding solid to said generating unit, a gas outlet from said generating unit, means for discharging solid from said generating unit; a scrubbing unit for receiving the generated gas from said gas outlet, liquid inlets to said scrubbing unit for aqueous sludge, means for collecting sludge from the scrubbing unit following contact with the gas; a gas cooling unit, liquid inlets in said gas cooling unit, a liquid feed to the inlets in said cooling unit, liquid cooling means connected to said gas cooling unit, means for collecting cooling liquid after contacting the gas; connections for conveying the collected liquid through the cooling means to inlets in said cooling unit and to inlets in said scrubbing unit, connections for conveying the sludge collected from said scrubbing apparatus part to said liquid inlets in the scrubbing apparatus and part to the liquid inlet to said generating apparatus, gas communications for conveying scrubbed gas from said scrubbing unit to said cooling unit, and means for discharging cooled gas from said cooling unit; temperature responsive means in said gas outlet, control means controlling said liquid inlet, said control means being automatically governed by said temperature responsive means, liquid level indicating means in said scrubbing unit, means controlling the liquid inlet to said scrubbing inlet, said liquid inlet to the scrubbing unit being automatically controlled by said liquid level means; liquid level indicating means in said cooling unit, means for controlling the supply of fresh water to the cooling unit, the means controlling the supply of fresh water being automatically controlled by the liquid level means in the cooling unit, solid-control means for controlling said means for feeding solid, and means responsive to a selected condition for regulating said solid-control means, whereby the entire reaction, scrubbing, cooling, feeding and discharge of the various materials is accomplished in response to the selected condition.

10. A continuous process of producing acetylene and lime hydrate, comprising, continuously feeding together calcium carbide and aqueous liquid into a generating chamber to form a charge in which the two constituents are brought together immediately, continuously agitating the charge to cause the rapid mixing and inter-action of the constituents, continuously removing the gases of reaction from the generating chamber, regulating the rate of liquid fed in automatic response to a control point in the temperature of said gases whereby the amount of liquid fed is maintained within a general range proportioned to the carbide effectively to react with the carbide completely and to absorb the heat of reaction, and modulating the rate of liquid fed at said temperature control point in automatic response to changes in the consistency of the charge and substantially independently of the temperature of the gases whereby more liquid is fed when the charge becomes heavier and less when the charge becomes lighter so that the range of liquid feed rate is extended beyond that normally provided by said temperature control point to compensate for changes in the characteristics of the carbide, and continuously discharging gas and lime hydrate.

11. A process, according to claim 10, wherein the rate of feed of the carbide is regulated in automatic response to the demand for acetylene.

12. A process, according to claim 10, wherein the lime hydrate is discharged in automatic response to the amount of lime hydrate produced.

13. In the process of producing acetylene, the steps of, continuously feeding calcium carbide to a generating zone from a main supply zone through a feeding zone closed from the atmosphere, isolating one portion of said feeding zone from a succeeding portion thereof thereby to prevent direct communication between said supply zone and said generating zone, establishing communication between said one portion and said succeeding portion and isolating a terminal portion of said zone from preceding portions including said one portion and said succeeding portion, and repeating said isolation and establishment in cycles so that there is never a direct communication between said generating and said supply zone, carbide being advanced toward the terminal portion of the feeding zone from the portions of the feeding zone isolated from said generating zone while carbide is advanced from the portion of the feeding zone in communication with the generating zone; and replacing carbide removed from each portion of the feeding zone with an inert gas, and venting the inert gas from said portion as carbide enters.

14. An apparatus for the production of a gas and a residual solid by the reaction of a solid and a liquid, comprising, a generating chamber, means for feeding solids to said chamber, means for feeding liquid to said chamber, both feeding means being arranged whereby the solid and liquid are brought into immediate contact to form a wet mixture, a restricted passage leading from said chamber to remove the gases of the reaction therefrom, agitating means for agitating said mixture within the chamber, solid control means for regulating the supply of said solid, liquid control means for regulating the supply of said liquid, temperature responsive means in said restricted passage adapted to move in response to fluctuations in temperature, said liquid control means being adapted for increasing and decreasing the amount of liquid fed within a general range, means adapting said liquid control means for adjustment corresponding to the movements of said temperature responsive means whereby the amount of liquid fed is responsive to the temperature of said gas, means responsive to the load on the agitating means acting on said control means substantially independently of said temperature responsive means to modulate the movement of said control means thereby extending said range in response to the consistency of the charge.

15. An apparatus, according to claim 14, wherein said temperature responsive means includes an enclosed chamber containing heat expansible liquid and said liquid control means includes a valve, a pressure-actuated member connected to said valve whereby the valve may be opened and closed by pressure in said actuating member, a pressure communication between said pressure-actuated member and said enclosed chamber whereby responses to temperature fluctuations in said instrument are communicated to said pressure actuated member, means for increasing and decreasing the resistance of said valve to adjustment, said last named means including electrical means in series with an electric motor driving the agitating means adapted to modulate the action of said valve in response to variations in the consistency of the charge and independently of the temperature of the gases.

16. In an apparatus for generating a gas and a residual solid by the reaction of a liquid and a solid, including a generating chamber; a feed mechanism to deliver solid to said generating chamber; supply mechanism for supplying solid; an initial chamber, an intermediate chamber and a delivery chamber communicating in series and disposed between said feed mechanism and said supply mechanism; a first valve between the initial chamber and the intermediate chamber, a second valve between the intermediate chamber and the delivery chamber; means responsive to the movement of solid through said chambers for closing the second valve and opening the first valve, and reclosing the first valve and reopening the second valve, and means responsive to the movement of solid through said chambers for stopping and starting said supply means.

17. In an apparatus for generating a gas and a residual solid by the reaction of a liquid and a solid, including a generating chamber; a feed mechanism to deliver solid to said generating chamber; supply mechanism for supplying solid; an initial chamber, an intermediate chamber and a delivery chamber communicating in series and disposed between said feed mechanism and said supply mechanism; a first valve between the initial chamber and the intermediate chamber, a second valve between the intermediate chamber and the delivery chamber; means responsive to the movement of solid through said chambers for closing the second valve and opening the first valve, and after a definite time reclosing the first valve and reopening the second valve, and means responsive to the movement of solid through said chambers for stopping and starting said supply means.

18. A continuous process of producing acetylene and lime hydrate, comprising, continuously feeding together calcium carbide and aqueous liquid into a generating chamber to form a charge in which the two constituents are brought together immediately, continuously agitating the charge to cause the rapid mixing and inter-action of the constituents, continuously removing the gases of reaction from the generating chamber through a restricted passage, regulating the rate of liquid fed thereby to maintain a proportion of liquid to solid within a range effective to react with the carbide completely and to absorb the heat of reaction, and modulating the rate of liquid fed in response to changes in the consistency of the charge of carbide thereby to maintain the proportion of liquid to solid within a more specific range effective to react with the carbide completely and to absorb the heat of the reaction.

19. A continuous process of producing acetylene and lime hydrate, comprising, continuously feeding together calcium carbide and aqueous liquid into a generating chamber to form a charge in which the two constituents are brought together immediately, continuously agitating the charge to cause the rapid mixing and inter-action of the constituents, continuously removing the gases of reaction from the generating chamber through a restricted passage, regulating the rate of liquid fed in proportion to the deviation from a control point within the range from about 195° F. to about 210° F., shifting the control point to an amount up to 10° F. when the consistency of the charge passes a certain degree of heaviness to compensate for changes in the consistency of the charge.

20. An apparatus, according to claim 9, wherein the means responsive to the selected condition is means responsive to the gasometer level which responds to the demand for gas.

21. A continuous process of producing acetylene and lime hydrate, comprising, continuously feeding together calcium carbide and aqueous liquid into a generating chamber to form a charge in which the two constituents are brought together immediately, continuously agitating the charge to cause the rapid mixing and inter-action of the constituents, continuously removing the gases of reaction from the generating chamber, regulating the rate of liquid fed in automatic response to measuring means responsive to the temperature of the gases generated in the reaction and to the consistency of the charge thereby maintaining the amount of liquid fed in proportion to the amount of carbide fed and modulating the amount of liquid fed in automatic response to the consistency of the charge thereby maintaining the amount of liquid fed equal to that which reacts with the carbide most effectively.

22. An apparatus for the production of a gas and a residual solid by the reaction of a solid and a liquid comprising a generating chamber, means for feeding solids to said chamber, means for feeding liquid to said chamber, both feeding means being arranged whereby the solid and liquid are brought into immediate contact to form a wet mixture, a passage leading from said chamber to remove the gases of the reaction therefrom, agitating means for agitating said mixture within the chamber, solid control means for regulating the supply of said solid, liquid control means for regulating the supply of said liquid directly responsive to temperature measuring means in said passage, means for shifting the control point of said liquid control means in response to variations in the power required to drive the agitating means thereby making the means for feeding liquid partly responsive to the consistency of the charge.

A. H. ANDERSEN.
M. EATON.
A. C. HOLM.

REFERENCES CITED

The following references are of record in the file of this patent:

UNITED STATES PATENTS

| Number | Name | Date |
| --- | --- | --- |
| 2,357,186 | Gfeller | Aug. 29, 1944 |
| 2,343,185 | Holm, et al. | Feb. 29, 1944 |
| 2,278,521 | Hojola, et al. | Apr. 7, 1942 |
| 2,263,658 | Tuel, et al. | Nov. 25, 1941 |
| 2,233,108 | Ness, et al. | Feb. 25, 1941 |
| 1,947,120 | Weibezahn, et al. | Feb. 13, 1934 |